US007302555B2

(12) United States Patent
Leijten (10) Patent No.: US 7,302,555 B2
(45) Date of Patent: Nov. 27, 2007

(54) ZERO OVERHEAD BRANCHING AND LOOPING IN TIME STATIONARY PROCESSORS

(75) Inventor: Jeroen Anton Johan Leijten, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 56 days.

(21) Appl. No.: 10/554,621

(22) PCT Filed: Apr. 27, 2004

(86) PCT No.: PCT/IB2004/050527

§ 371 (c)(1),
(2), (4) Date: Oct. 27, 2005

(87) PCT Pub. No.: WO2004/097625

PCT Pub. Date: Nov. 11, 2004

(65) Prior Publication Data

US 2007/0055851 A1   Mar. 8, 2007

(30) Foreign Application Priority Data

Apr. 29, 2003   (EP) .................................. 03101175

(51) Int. Cl.
*G06F 9/38* (2006.01)
(52) U.S. Cl. ......................... 712/234; 712/24
(58) Field of Classification Search .................. 712/24, 712/234
See application file for complete search history.

(56) References Cited

U.S. PATENT DOCUMENTS 6,366,999 B1   4/2002   Drabenstott et al.

7,080,234 B2 *   7/2006   Saulsbury et al. ............ 712/24
2002/0032849 A1   3/2002   Saulsbury et al.

OTHER PUBLICATIONS

"Embedded software in real-time signal processing systems: design technologies", G. Goossens, J. van Praet, D. Lanneer, W. Geurts, A. Kifli, C. Liem and P. Paulin, Proceedings of the IEEE, vol. 85, No. 3, Mar. 1997.
European Patent Application 03101038.2.
B. Ulmann, "MU-EP-1 A Simple 32-Bit Architecture", computer Architecture News, Association for Computing Machinery, New York, vol. 23, No. 3, Jun. 1, 1995, pp. 19-24.

* cited by examiner

*Primary Examiner*—William M. Treat
(74) *Attorney, Agent, or Firm*—Leydig, Voit & Mayer, Ltd.

(57) ABSTRACT

Programmable processors are used to transform input data into output data based on program information encoded in instructions. The value of the resulting output data depends, amongst others, on the momentary state of the processor at any given moment in time. This state is composed of temporary data values stored in registers, for example, as well as so-called flags. A disadvantage of the principle of flags, is that they cause side effects in the processor, especially in parallel processors. However, when removing the traditional concept of flags, the remaining problem is the implementation of branching. A processing system according to the invention comprises an execution unit (EX1, EX2), a first register file (RF1, RF2) for storing data, a memory (PM) and a second register file (RF3) for storing a program counter. The execution unit conditionally executes dedicated instructions for writing a value of the program counter into the second register file. As a result, the processing system according to the invention allows conditional branching, without the use of flags.

13 Claims, 2 Drawing Sheets

ZERO OVERHEAD BRANCHING AND LOOPING IN TIME STATIONARY PROCESSORS

TECHNICAL FIELD

The present invention generally relates to improvements in digital processing and more particularly to a method, apparatus and compiler for supporting conditional branching as well as looping in parallel processors.

BACKGROUND ART

Programmable processors are used to transform input data into output data based on program information encoded in instructions. The values of the resulting output data are dependent on the input data, the program information, and on the momentary state of the processor at any given moment in time. In traditional processors this state is composed of temporary data values stored in registers, for example, as well as so-called flags. These flags are normally used to set specific rounding modes during computation, to influence the semantics of certain operations, or to change the program flow, to name a few. Flags are normally stored in a special flags register, in which flags are rewritten after every instruction that is capable of changing one or more flags. It is usually not possible to have multiple values of the same flag alive at any given point in time inside the processor.

The ongoing demand for an increase in high performance computing has led to the introduction of several solutions in which some form of concurrent processing, i.e. parallelism, has been introduced into the processor architecture. Two main concepts have been adopted: the multithreading concept, in which several threads of a program are executed in parallel, and the Very Large Instruction Word (VLIW) concept. In case of a VLIW processor, multiple instructions are packaged into one long instruction, a so-called VLIW instruction. A VLIW processor uses multiple, independent execution units to execute these multiple instructions in parallel. The processor allows exploiting instruction-level parallelism in programs and thus executing more than one instruction at a time. Due to this form of concurrent processing, the performance of the processor is increased. In order for a software program to run on a VLIW processor, it must be translated into a set of VLIW instructions. The compiler attempts to minimize the time needed to execute the program by optimizing parallelism. The compiler combines instructions into a VLIW instruction under the constraint that the instructions assigned to a single VLIW instruction can be executed in parallel and under data dependency constraints. The encoding of parallel instructions in a VLIW instruction leads to a severe increase of the code size. Large code size leads to an increase in program memory cost both in terms of required memory size and in terms of required memory bandwidth. In modern VLIW processors different measures are taken to reduce the code size. One important example is the compact representation of no operation (NOP) operations in a data stationary VLIW processor, i.e. the NOP operations are encoded by single bits in a special header attached to the front of the VLIW instruction, resulting in a compressed VLIW instruction.

To control the operations in the data pipeline of a processor, two different mechanisms are commonly used in computer architecture: data-stationary and time-stationary encoding, as disclosed in "Embedded software in real-time signal processing systems: design technologies", G. Goossens, J. van Praet, D. Lanneer, W. Geurts, A. Kifli, C. Liem and P. Paulin, Proceedings of the IEEE, vol. 85, no. 3, March 1997. In the case of data-stationary encoding, every instruction that is part of the processor's instruction-set controls a complete sequence of operations that have to be executed on a specific data item, as it traverses the data pipeline. Once the instruction has been fetched from program memory and decoded, the processor controller hardware will make sure that the composing operations are executed in the correct machine cycle. In the case of time-stationary coding, every instruction that is part of the processor's instruction-set controls a complete set of operations that have to be executed in a single machine cycle. These operations may be applied to several different data items traversing the data pipeline. In this case it is the responsibility of the programmer or compiler to set up and maintain the data pipeline. The resulting pipeline schedule is fully visible in the machine code program. Time-stationary encoding is often used in application-specific processors, since it saves the overhead of hardware necessary for delaying the control information present in the instructions, at the expense of larger code size. In case of a data-stationary processor, the conditional execution of operations can be implemented without the use of jump operations. However, for a conventional time-stationary processor the conditional execution of operations is not possible, without the use of jump operations. In a previous application (EP filing nr. 03101038.2 [attorney's docket: PHNL030384EPP]), a time-stationary processor is disclosed which allows the conditional execution of operations without the use of jump operations.

A disadvantage of the principle of flags and the way they are stored as well as updated, is that they cause so-called side effects in the processor, that is, behavior that is not explicitly visible in the program. Instead, side effects cause a kind of implicit behavior where the same operation in different parts of the program can exhibit different semantics, dependent on operations that have taken place earlier. Programs could be made more efficient if the updating of flags could be better controlled by the program. For example, if a branch has to take place on the zero outcome of a subtraction, a branch using the zero-flag as a condition could be used. In that case, however, no operation changing the zero-flag may be scheduled between the subtract operation and the branch operation. Since usually many operations update the flags, the subtract operation must often be scheduled just before the branch operation. These kinds of constraints severely limit the schedule freedom in programs, ruling out potentially more efficient schedules. In general, one could say that flags make it much harder to create powerful compilers for high level languages, such as the C programming language. Especially in parallel processors, like VLIW processors, flags impose an additional problem, because if multiple operations can be executed in parallel it is unclear which operation should be allowed to update the flags register. Ideally, compiler-friendly VLIW processors exhibit only a minimum number of side-effects. By removing the traditional concept of flags many of such side-effects can be eliminated. For example, special rounding modes or other special operation semantics can be implemented by using special opcodes, e.g. a special addc instruction for an addition with carry taken as a third data input next to the data inputs of a normal add instruction. In this way, flags are treated as data. However, a remaining problem is the implementation of branching that is normally handled by using flags, for example, taking the zero flag to decide on a branch-on-equal.

It is an object of the invention to enable the use of branching and looping in processors, especially in parallel processors, without the use of flags.

DISCLOSURE OF INVENTION

This object is achieved with a processing system arranged for execution of a set of instructions under control of a program counter, the processing system comprising: an execution unit, a first register file for storing data, the first register file being accessible by the execution unit, a program memory for storing the set of instructions, a second register file for storing a value of the program counter, the second register file being accessible by the execution unit, and wherein the execution unit is arranged to conditionally execute a dedicated instruction for writing a value of the program counter into the second register file. The computation means can comprise adders, multipliers, means for performing logical operations, e.g. AND, OR, XOR etc., lookup table operations, memory accesses, etc.

During normal sequential execution of instructions, the value of the program counter is incremented each cycle. However, branching and looping during execution of instructions requires that the program counter can switch to a value different from its increment, in order to point to the target instruction that should be executed next. By conditionally executing the dedicated instruction, the execution unit is allowed to write a value of the program counter into the second register file in case the condition is true. If the condition is not true, the value of the program counter is not written into the second register file. In the first case, the program counter will point to the branch or loop target instruction that should be executed next. In the second case, the program counter can be incremented as normal, and no branching or looping is performed. As a result, conditional branching and looping is allowed, without the need for flags.

U.S. Pat. No. 6,366,999 describes a method and an apparatus for supporting conditional execution in a Very Large Instruction Word processor. Conditional state produced by execution instructions is saved in so-called arithmetic condition flags (ACFs). The ACFs are used in both conditional branching and for conditional execution. In addition, the ACFs contain state information that is set as a result of an instruction execution or set as a result of a Boolean combination of state information. These ACFs can be specified and used by conditional instructions thereby minimizing the use of conditional branches. However, it does not disclose how to perform conditional branching in a processor without the use of flags, nor does it disclose how such a processor could be realized.

An embodiment of the invention is characterized in that the execution unit is further arranged to evaluate a branch condition and subsequently use the result of the evaluation as a guard to conditionally execute a first dedicated instruction for writing a value of the program counter into the second register file. The branch condition can be calculated in advance and using the dedicated instruction the conditional write back of a value of the program counter to the second register file is implemented.

An embodiment of the invention is characterized in that the execution unit is further arranged to execute a second dedicated instruction, the second dedicated instruction having at least a first argument and a second argument, the second argument being a value of the program counter, wherein the second dedicated instruction is arranged to write the value of the program counter into the second register file, depending on the value of the first argument. The first argument can be the value of a branch condition or any other data value. In principle, any kind of operation and any kind of execution unit could in this way change the program counter value and hence implement conditional branching or looping.

Further embodiments of the invention are described in the dependent claims. According to the invention a method for programming said processing system, as well as a compiler program product being arranged for implementing all steps of said method for programming a processing system, when said compiler program product is run on a computer system, are claimed as well.

DESCRIPTION OF PREFERRED EMBODIMENTS

Figure 1:
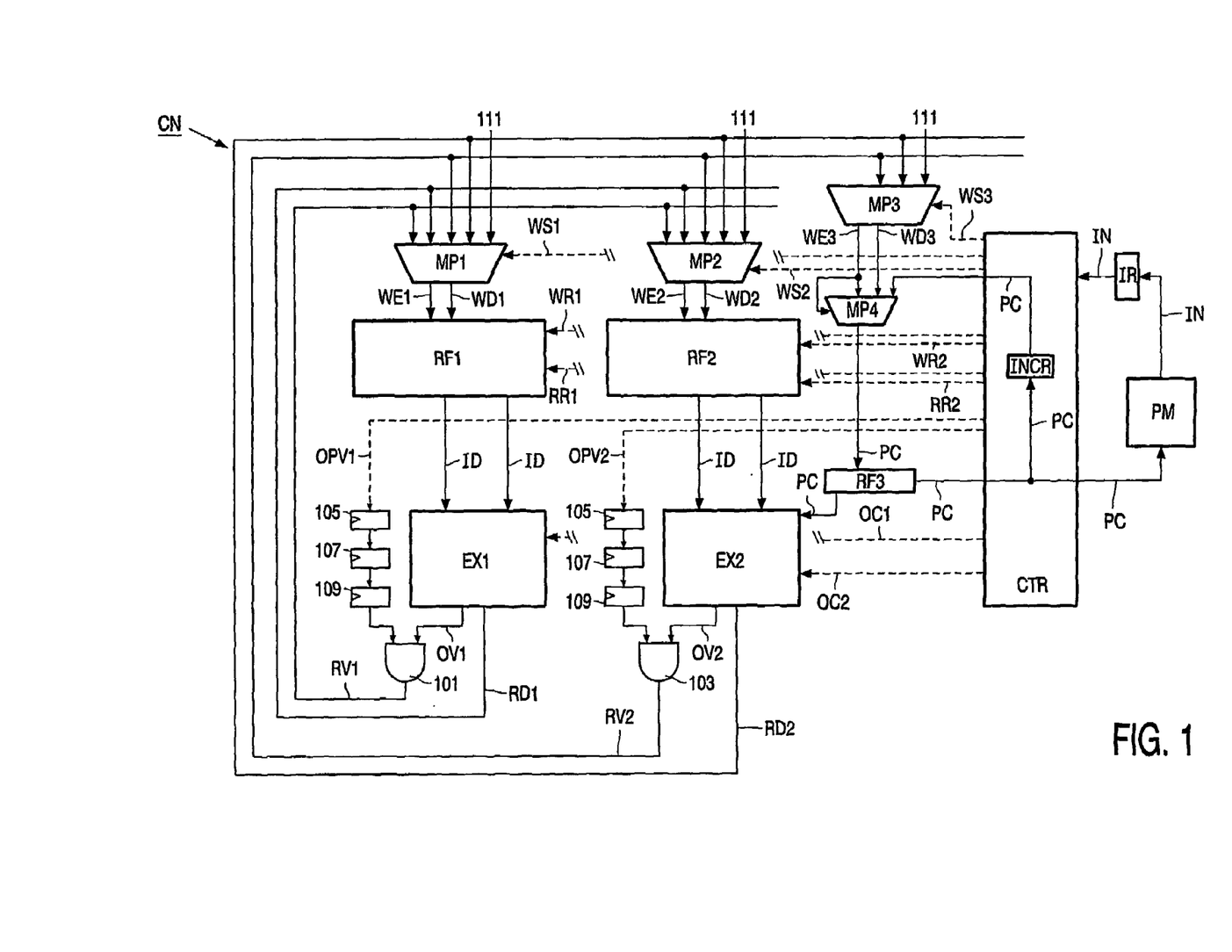
FIG. 1 shows a schematic block diagram of a first VLIW processor according to the invention.
Figure 2:
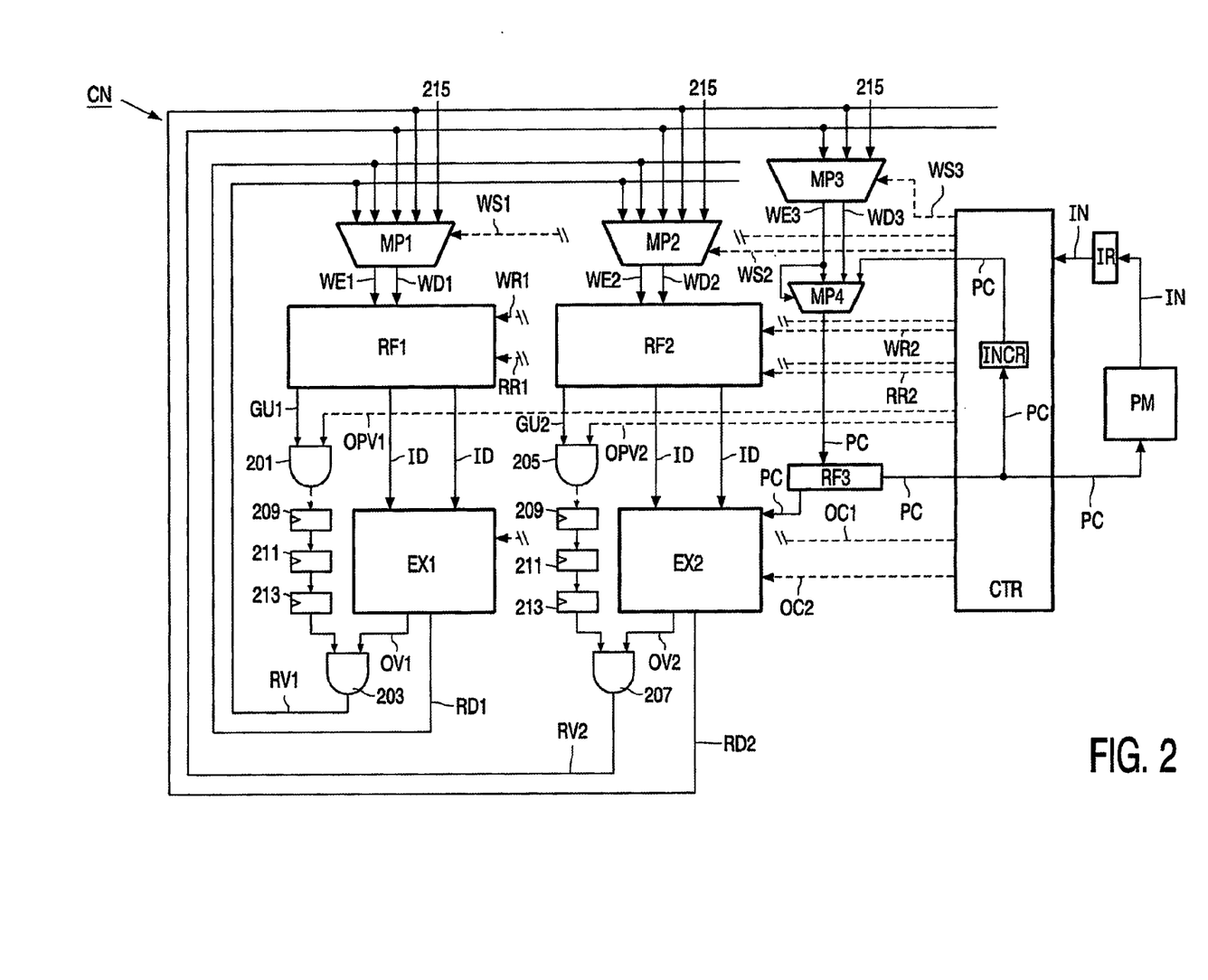
FIG. 2 shows a schematic block diagram of a second VLIW processor according to the invention.

Referring to FIG. 1 and FIG. 2, a schematic block diagram illustrates a time-stationary VLIW processor comprising a plurality of execution units EX1 and EX2, and a distributed register file, including register files RF1 and RF2. The register files RF1 and RF2 are accessible by execution units EX1 and EX2, respectively, for retrieving input data ID from the register file. The execution units EX1 and EX2 also are coupled to the register files RF1 and RF2 via the communication network CN and multiplexers MP1 and MP2, for passing result data RD1 and RD2 from said execution units as write data WD1 and WD2 to the distributed register file. The processor further comprises a register file RF3 for storing a value of the program counter PC. Execution unit EX2 is coupled to register file RF3, via the communication network CN and multiplexers MP3 and MP4, for writing result data RD2 as write data WD3 into register file RF3. The execution unit EX2 can also read the value of the program counter PC from the register file RF3, via a direct connection between execution unit EX2 and register file RF3. The controller CTR reads the value of the program counter PC from the register file RF3. This value of the program counter points to an address in the program memory PM where the instruction that should be executed next is stored. Using the value of the program counter PC, the controller CTR fetches the instruction IN from the program memory PM. The instruction IN is stored in the instruction register IR. Next, the instruction IN is retrieved from the instruction register IR by the controller CTR, and the controller CTR decodes the instruction IN. The controller CTR also increments the value of program counter PC, read from register file RF3, using unit INCR, and sends the incremented value of the program counter PC to multiplexer MP4. Via multiplexer MP4, either the incremented value of program counter PC or a value of the program counter corresponding to write data WD3 is stored in register file RF3, depending on the value of write enable index WE3. In case the write enable index WE3 is equal to true, the value of the program counter corresponding to write data WD3 is written into register file RF3, otherwise the incremented value of the program counter PC is written into register file RF3. In general, the instructions that are executed comprise RISC like operations, requiring only two operands and producing only one result, as well as custom operations that can consume more than two operands and/or that can produce more than one result. Some instructions may require small or large immediate values as operand data. Results of the decoding step are the write select indices WS1, WS2 and WS3, write register indices WR1 and WR2, read register indices RR1 and RR2, operation valid indices OPV1 and OPV2, and opcodes OC1 and OC2. Via the couplings between the controller CTR and multiplexers MP1, MP2 and MP3, the write select indices WS1, WS2 and WS3 are provided to the multiplexers MP1, MP2 and MP3, respectively. The write select indices WS1, WS2 and WS3 are used by the corresponding multiplexer for selecting the required input channel from the communication network CN for the data WD1, WD2 and WD3 that have to be written into register files RF1, RF2 and RF3, respectively. The write select indices WS1, WS2 and WS3 are also used by the corresponding multiplexer for selecting the input channel from the communication network CN for the write enable indices WE1, WE2 and WE3 that are used to enable or disable the actual writing of data WD1, WD2 and WD3 to the corresponding register file RF1, RF2 or RF3. The controller CTR is coupled to the register files RF1 and RF2 for providing the write register indices WR1 and WR2, respectively, for selecting a register from the corresponding register file to which data have to be written. The controller CTR also provides the read register indices RR1 and RR2 to the register files RF1 and RF2, respectively, for selecting a register from the corresponding register file from which input data ID have to be read by the execution units EX1 and EX2, respectively. Register file RF3 only has one register and therefore requires no read register index as well as no write register index. The controller CTR is coupled to the execution units EX1 and EX2 as well, for providing the opcodes OC1 and OC2, respectively, that define the type of operation that the execution unit EX1 or EX2 has to perform on the corresponding input data ID. The operation valid indices OPV1 and OPV2 are also provided to execution units EX1 and EX2, respectively, and these indices indicate if a valid operation is defined by the corresponding opcode OC1 or OC2. The value of the operation valid indices OPV1 and OPV2 is determined during decoding of the VLIW instruction. The controller obtains the write select indices WS1, WS2 and WS3 from the program after decoding, and directly provides the write select indices to the corresponding multiplexer MP1, MP2 or MP3.

Referring to FIG. 1, the controller CTR is coupled to registers 105. The controller CTR derives operation valid indices OPV1 and OPV2 from the program during the decoding step and these operation valid indices are provided to the registers 105. In case the encoded operation is a NOP operation, the operation valid index is set to false, otherwise the operation valid index is set to true. The operation valid indices OPV1 and OPV2 are delayed according to the pipeline of the corresponding execution unit EX1 and EX2 using registers 105, 107 and 109. In alternative embodiments, a different number of registers may be present, depending on the pipeline depth of the corresponding execution unit. After execution of the operations by execution unit EX1 and EX2, as defined via opcodes OC1 and OC2 respectively, the corresponding result data RD1 and RD2 as well as the corresponding output valid indices OV1 and OV2 are produced. The output valid index OV1 or OV2 is true if the corresponding result data RD1 or RD2 are valid, otherwise it is false. Unit 101 performs a logic AND on the delayed operation valid index OPV1 and the output valid index OV1, resulting in a result valid index RV1. Unit 103 performs a logic AND on the delayed operation valid index OPV2 and the output valid index OV2, resulting in a result valid index RV2. The units 101 and 103 are both coupled to multiplexers MP1 and MP2, via the partially connected network CN, for passing the result valid indices RV1 and RV2 to the multiplexers MP1 and MP2. Only unit 103 is coupled to multiplexer MP3, via the partially connected network CN, for passing the result valid index RV2 to the multiplexer MP3. The write select indices WS1 and WS2 are used by the corresponding multiplexers MP1 and MP2 to select a channel from the connection network CN from which result data have to be written to the corresponding register file, as write data WD1 or WD2, respectively. In case a result data channel is selected by multiplexer MP1 or MP2, the result valid indices RV1 and RV2 are used to set the write enable indices WE1 and WE2, for control of writing result data RD1 and RD2 to the register files RF1 and RF2, respectively. In case multiplexer MP1 or MP2 has selected the input channel corresponding to result data RD1, result valid RV1 is used for setting the write enable index corresponding to that multiplexer, and in case the input channel corresponding to result data RD2 is selected, result valid index RV2 is used for setting the corresponding write enable index. If multiplexer MP3 has selected the input channel corresponding to result data RD2, result valid RV2 is used for setting the write enable index WE3, for control of storing write data WD3 into register file RF3. If result valid index RV1 or RV2 is true, the appropriate write enable index WE1, WE2 or WE3 is set to true by the corresponding multiplexer MP1, MP2 or MP3. In case the write enable index WE1 or WE2 is equal to true, the result data RD1 or RD2 are written into the register file RF1 or RF2, in a register selected via the write register index WR1 or WR2 corresponding to that register file. In case the write enable index WE1 or WE2 is set to false, though via the corresponding write select index WS1 or WS2 an input channel for writing data to corresponding register file RF1 or RF2 has been selected, no data will be written into that register file. In case the write enable index WE3 is set to true, multiplexer MP4 selects the channel corresponding to write data WD3 as input and the result data RD2 are written into register file RF3. In case the write enable index WE3 is set to false, multiplexer MP4 selects the channel corresponding to program counter PC as input and the value of program counter PC is written into register file RF3. In order to disable the write back of any result data RD1 or RD2 via a given write port of register files RF1, RF2 and RF3, respectively, the write select index WS1, WS2 or WS3 corresponding to that register file can be used to select the default input 111 from the corresponding multiplexer MP1, MP2 or MP3, in which case the corresponding write enable index WE1, WE2 or WE3 is set to false.

Referring to FIG. 2, the controller CTR is coupled to logic units 201 and 205. The controller CTR retrieves operation valid indices OPV1 and OPV2 from the program during the decoding step and these operation valid indices are provided to logic unit 201 and 205, respectively. In case the encoded operation is a NOP operation, the operation valid index is set to false, otherwise the operation valid index is set to true. The register files RF1 and RF2 are coupled to unit 201 and 205 respectively, and the values of the corresponding guards GU1 and GU2 can be written from the register files RF1 and RF2 to the units 201 and 205, respectively. The guards GU1 and GU2 can be either true or false, depending on the outcome of the operation during which the value of the data representing that guard was determined. Units 201 and 205 perform a logic AND on the corresponding operation valid index OPV1 or OPV2, and the corresponding guard GU1 or GU2. The resulting index is delayed according to the pipeline of the corresponding execution unit EX1 and EX2 using registers 209, 211 and 213. After the operation, defined via opcode OC1 or OC2, has been executed by execution unit EX1 and EX2, respectively, the corresponding result data RD1 and RD2 as well as the corresponding output valid index OV1 and OV2 are produced. The output valid indices OV1 and OV2 are true if the corresponding result data RD1 or RD 2 are valid output data, otherwise they are false. Unit 203 performs a logic AND on the delayed index, resulting from guard GU1 and operation valid index OPV1, and the output valid index OV1, resulting in a result valid index RV1. Unit 207 performs a logic AND on the delayed index, resulting from guard GU2 and operation valid index OPV2, and the output valid index OV2, resulting in a result valid index RV2. The units 203 and 207 are coupled to multiplexers MP1 and MP2, respectively, via the partially connected network CN, for passing the result valid indices RV1 and RV2 to multiplexers MP1 and MP2. Only unit 207 is coupled to multiplexer MP3, via the partially connected network CN, for passing the result valid index RV2 to the multiplexer MP3. The write select indices WS1 and WS2 are used by the corresponding multiplexers MP1 and MP2 to select a channel from the connection network CN from which result data have to be written to the corresponding register file, as write data WD1 or WD2, respectively. In case a result data channel is selected by a multiplexer, the result valid indices RV1 and RV2 are used to set the write enable indices WE1 and WE2, for control of writing result data RD1 and RD2 into the register files RF1 and RF2, respectively. In case multiplexer MP1 or MP2 has selected the input channel corresponding to result data RD1, result valid RV1 is used for setting the write enable index corresponding to that multiplexer, and in case the input channel corresponding to result data RD2 is selected, result valid index RV2 is used for setting the corresponding write enable index. If multiplexer MP3 has selected the input channel corresponding to result data RD2, the result valid index RV2 is used for setting the write enable index WE3, for control of storing write data WD3 into register file RF3. If result valid index RV1 or RV2 is true, the appropriate write enable index WE1, WE2 or WE3 is set to true by the corresponding multiplexer MP1, MP2 or MP3. In case the write enable index WE1 or WE2 is equal to true, the result data RD1 or RD2 are written into the register file RF1 or RF2, in a register selected via the write register index WR1 or WR2 corresponding to that register file. In case the write enable index WE1 or WE2 is set to false, though via the corresponding write select index WS1 or WS2 an input channel for writing data to corresponding register file RF1 or RF2 has been selected, no data will be written into that register file. In case the write enable index WE3 is set to true, multiplexer MP4 selects the channel corresponding to write data WD3 as input and the result data RD2 are written into register file RF3. In case the write enable index WE3 is set to false, multiplexer MP4 selects the channel corresponding to program counter PC as input and the value of program counter PC is written into register file RF3. In order to disable the write back of any result data RD1 or RD2 via a given write port of register files RF1 and RF2 or register file RF3, respectively, the write select index WS1, WS2 or WS3 corresponding to that register file can be used to select the default input 215 from the corresponding multiplexer MP1 or MP2, in which case the corresponding write enable index WE1, WE2 or WE3 is set to false.

The time-stationary VLIW processors according to FIG. 1 and FIG. 2 allow dynamically controlling the write back of result data into the register files RF1, RF2 and RF3. It can be determined during run-time if the result data of an operation that has been executed have to be written back to the register files RF1, RF2 or RF3. As a result, conditional execution of operations can be implemented by these processors, while still using time-stationary encoding of instructions.

Below an example of a piece of program code is shown, that should be executed by a processor according to the invention. Each line refers to a single VLIW instruction, which may comprise statements that can be executed in parallel, e.g. a VLIW instruction comprising instructions A0 and A1. In this program code the letters A0, A1, B0, B1, C0 and C1 refer to instructions, Z and P refer to variables, and X to a condition that can either be false or true. L1 refers to an address of program memory PM. The abbreviation bra refers to a branch instruction, which is a dedicated instruction used for conditional branching.

. . .
A0, A1;
Z=bra (X, P);
B0, B1;
. . .
L1: C0, C1;
. . .

The program code can be executed by a processor according to the invention as follows. Referring to FIG. 1, the controller CTR decodes the VLIW instructions, and sends the resulting write select indices WS1, WS2 and WS3 to the corresponding multiplexers MP1, MP2 and MP3, the write register indices WR1 and WR2 as well as read register indices RR1 and RR2 to the corresponding register files RF1 and RF2, the operation codes OC1 and OC2 to the corresponding execution units EX1 and EX2 and the operation valid indices OPV1 and OPV2 to the corresponding register 105. These operation valid indices OPV1 and OPV2 are equal to "true". An instruction is executed by either execution unit EX1 or EX2 to determine the value of condition X. This instruction produces the result "true", and this result is stored in register file RF2. The value of parameter P is stored in register file RF2 as well. The value of parameter P is equal to the value of the program counter, indicating the address in program memory where the instruction is stored that should be executed when performing a conditional branch, i.e. program memory address L1. During compilation of the program, the compiler ensures that this value is assigned to parameter P. The branch instruction bra is executed by execution unit EX2. The value of condition X, as well as parameter P are received as input data ID by execution unit EX2. During execution of instruction bra, the value of condition X is evaluated by execution unit EX2 and if this value is equal to true, output valid index OV2 is set equal to true. In case the value of condition X is equal to false, the output valid index OV2 is set equal to false. In this example, the value of condition X is equal to true, and therefore the value of output valid index OV2 is set equal to true as well. Furthermore, execution unit EX2 assigns the value of parameter P to parameter Z, i.e. parameter Z is now equal to the value of the program counter indicating the address in program memory where the instruction is stored that should be executed when performing a conditional branch. Unit 103 performs a logic AND on the operation valid index OPV2 corresponding to instruction bra and the output valid index OV2. Since the operation valid index OPV2 is equal to true, the resulting result valid index RV2 is equal to true as well. The result valid index RV2 and the result data RD2, in the form of the value of parameter Z, are transferred to multiplexers MP1, MP2 and MP3 via partially connected network CN. Using write select index WS3, multiplexer MP3 selects the channel corresponding to result data RD2 as input channel. Multiplexer MP3 sets the write enable index WE3 equal to true using result valid index RV2, and the value of parameter Z is written to multiplexer MP4 as write data WD3. Multiplexer MP4 selects the channel corresponding to WD3 as the input channel, since the value of write enable index WE3 is equal to true. Next, the value of parameter Z, i.e. the value of the program counter PC, is written into register file RF3. As a result, the program counter stored in register file RF3 points to program memory address L1, and the VLIW instruction stored at that address, comprising instructions C0 and C1, is fetched from the program memory PM in the next cycle and subsequently decoded and executed.

In case the condition X is equal to false, the output valid index OV2 is set equal to false as well. Unit 103 performs a logic AND on the operation valid index OPV2 corresponding to instruction bra and the output valid index OV2. Though the operation valid index OPV2 is equal to true, the resulting result valid index RV2 is equal to false since the output valid OV2 is equal to false. The result valid index RV2 and the result data RD2, in the form of the value of parameter Z, are transferred to multiplexers MP1, MP2 and MP3 via partially connected network CN. Using write select index WS3, multiplexer MP3 selects the channel corresponding to result data RD2 as input channel. Multiplexer MP3 sets the write enable index WE3 equal to false using result valid index RV2, and the value of parameter Z is written to multiplexer MP4 as write data WD3. However, multiplexer MP4 selects the channel corresponding to program counter PC as the input channel, since the value of write enable index WE3 is equal to false. Next, the incremented value of program counter PC is written to register file RF3, instead of the program counter equal to parameter Z of the conditional branch instruction bra. As a result, in the next cycle the VLIW instruction comprising statements B0 and B1 is fetched from the program memory PM and subsequently decoded and executed Below another example of a piece of program code is shown, that should be executed by a processor according to the invention. In this program code the letters A0, A1, B0, B1, C0 and C1 refer to instructions, Z to a variable and X to a condition that can either be false or true. L1 refers to an address of program memory PM. Each line refers to a single VLIW instruction, which may comprise statements that can be executed in parallel, e.g. VLIW instruction comprising instructions A0 and A1.

. . .
A0, A1;
if (X) Z=jmp L1;
B0, B1;
. . .
L1: C0, C1;
. . .

Referring to FIG. 2, the controller CTR decodes the VLIW instructions, and sends the resulting write select indices WS1, WS2 and WS3 to the corresponding multiplexers MP1, MP2 and MP3, the write register indices WR1 and WR2 as well as read register indices RR1 and RR2 to the corresponding register files RF1 and RF2, the operation codes OC1 and OC2 to the corresponding execution units EX1 and EX2 and the operation valid indices OPV1 and OPV2 to the corresponding unit 201 and 205. These operation valid indices OPV1 and OPV2 are equal to "true". An instruction is executed by either execution unit EX1 or EX 2 to determine the value of condition X. This instruction produces the result "true", and this result is stored in register file RF2. The unit 205 also receives the value of condition X, as a corresponding guard GU2, and performs a logic AND of the guard GU2 and the operation valid index OPV2. The unit 205 will produce "true" as a result, since both the guard GU2 and the operation valid index OPV2 are equal to true. While statement Z=jmp L1 is executed by execution unit EX2, i.e. the value of program counter L1 is assigned to parameter Z, the results of the logic AND are clocked through the registers 209, 211 and 213 of execution unit EX2. The output valid index OV2 is equal to true. Unit 207 will perform a logic AND of the output valid index OV2 and the result of the logic AND performed by unit 205. The result of this logic AND will be true, and therefore result valid index RV2 is equal to true. Via partially connected network CN, the value of result valid index RV2 as well as the corresponding result data RD2, i.e. the value of parameter Z, are transferred to multiplexers MP1, MP2 and MP3. Using the write select index WS3, the multiplexer MP3 selects the input channel corresponding to result data RD2. The write enable index WE3 is subsequently set to true using result valid index RV2, and the result data RD2 are written to multiplexer MP4 as write data WD3. Multiplexer MP4 selects the channel corresponding to WD3 as the input channel, since the value of write enable index WE3 is equal to true. Next, the value of parameter Z, i.e. the value of the program counter PC, is written to register file RF3. As a result, in the next cycle the VLIW instruction comprising instructions C0 and C1 is fetched from the program memory PM and subsequently decoded and executed.

In case the condition X is equal to false, the value of guard GU2 is set equal to false as well. The unit 205 performs a logic AND of the guard GU2 and the operation valid index OPV2. The unit 205 will produce "false" as a result, since guard GU2 is equal to false. While statement Z=jmp L1 is executed by execution unit EX2, i.e. the value of program counter L1 is assigned to parameter Z, the results of the logic AND are clocked through the registers 209, 211 and 213 of execution unit EX2. The output valid index OV2 is equal to true. Unit 207 will perform a logic AND of the output valid index OV2 and the result of the logic AND performed by unit 205. The result of this logic AND will be false, and therefore result valid index RV2 is equal to false. Via partially connected network CN, the value of result valid index RV2 as well as the corresponding result data RD2, i.e. the value of parameter Z, are transferred to multiplexers MP1, MP2 and MP3. Using the write select index WS3, the multiplexer MP3 selects the input channel corresponding to result data RD2. The write enable index WE3 is subsequently set to false using result valid index RV2, and the result data RD2 are written to multiplexer MP4 as write data WD3. However, multiplexer MP4 selects the channel corresponding to program counter PC as the input channel, since the value of write enable index WE3 is equal to false. Next, the incremented value of program counter PC is written to register file RF3, instead of the value of the program counter equal to parameter Z. In the next cycle the VLIW instruction comprising instructions B0 and B1 is fetched from the program memory PM and subsequently decoded and executed.

These embodiments show that the present invention allows implementing conditional branching without the need for flags. The branch condition can be calculated in advance and either used as a guard to conditionally execute an operation that writes a new value of the program counter into register file RF3, or as an argument in a conditional operation for writing a new value of the program counter into register file RF3. In case the branch condition is equal to true, the new value for the program counter PC is written into register file RF3. The controller CTR reads the value of the program counter stored in register file RF3 and uses this value to fetch an instruction from the program memory PM. The controller CTR also increments the value of the program counter. The incremented value of the program counter PC is sent to multiplexer MP4. Whether the incremented value of the program counter PC or a value of the program counter corresponding to write data WD3 has to be written into register file RF3, is determined by the value of the write enable index WE3. As long as no explicit writes are made to the register file RF3 by execution unit EX2, the program will simply proceed by sequentially executing the instructions listed in the program memory. In case a new value of the program counter is written into register file RF3 by execution unit EX2, the written value of the program counter will change the program flow such that instruction execution proceeds from the address in the program memory corresponding to the written value.

In alternative embodiments, the processing system is a data-stationary VLIW processor. Data-stationary VLIW processors directly allow to dynamically control the write back of result data to the register file, since every instruction that is part of the instruction-set controls a complete sequence of operations that have to be executed on a specific data item. Therefore, a data-stationary VLIW processor can implement the conditional execution of operations as well. As a result, according to the invention, such a processor can implement conditional branching and looping without the need for flags as well.

In some embodiments, via a read port connection of register file RF3, execution unit EX2 can read the value of program counter PC directly from register file RF3. Execution unit EX2 can in this way implement "program counter relative branching" for position independent code. For instance, an offset value can be added to the program counter PC read from register file RF3, thereby creating a program counter relative jump target address. In alternative embodiments, the connection between register file RF3 and execution unit EX2 for reading the value of program counter PC can remain unused, or can not be present, for example if no program counter relative branching is applied.

In an alternative embodiment, multiple guarded or conditional operations could be executed in parallel to be updating the value of the program counter stored in register file RF3, as long as the compiler or assembly programmer ensures that only one guarded or conditional operation will produce a valid output in any given cycle, i.e. only one value of the program counter is written into register file RF3. This can be ensured as long as the conditions are disjoint. As a result, the parallel execution of branch targets and validation of branch conditions can be used to implement, for example, so-called case statements.

In order to obtain a processor implementation running at a sufficiently high clock frequency, the controller of the processor can be pipelined. Referring to FIGS. 1 and 2, one instruction register IR is present at the output of the program memory PM for storing the instruction IN loaded from the program memory PM. As a result, the delay between writing a new value of the program counter into register file. RF3 and the execution of the instruction retrieved from the program memory address corresponding to that new value is at least two cycles. This delay is referred to as the branch delay, and it can be any non-zero value, depending on the degree of pipelining of the processor. Branch delay can result in execution time overhead, unless the cycles that are part of the delay of the branch, referred to as the branch shadow, are still allowed to be used to execute other operations. These other operations would then be operations that in the original algorithm represented by the program should be performed before the change in program flow should take place. In an alternative embodiment, the processor implements a concept known as delayed branching, in which non-branch operations can still be executed in the shadow of the branch. As a result, in the program a branch operation is scheduled a branch latency ahead of the point where the branch is really taken. This is shown in the following program construct, wherein each line refers to a single VLIW instruction, z, x, y, u, d and e refer to variables, pc refers to a variable representing a value of the program counter, A refers to an address of the program memory, add refers to an operation for adding two values, mul refers to an operation for multiplying two values, jmp refers to a branch operation:

```
...
pc = jmp A;    /* branch operation with latency two */
z = add x y;   /* branch shadow in which operation add is still executed*/
               /* point at which the jump to A takes place */
u = mul d e;   /* this statement is skipped, because of the taken branch */
...
A: ...         /* branch target */
...
```

Delayed branching in effect enables zero-overhead branching without further additional hardware, such as loop stacks and the like, which are customary in most conventional digital signal processors.

In another embodiment, scheduling of branch operations in the branch shadow is allowed. The present invention supports this concept as well, such that the zero-overhead branching concept can be further extended to include the possibility of creating loop bodies that consist of a number of instructions or cycles that is smaller than the branch latency. This is obtained, for instance, by the following program construct in which a branch latency of two cycles is assumed, and wherein each line refers to a single VLIW instruction, z, x, y, u, d and e refer to variables, i refers to a loop counter, pc refers to a variable representing a value of the program counter, A refers to an address of the program memory, add refers to an operation for adding two value, dec refers to an operation for decrementing a value, mul refers to an operation for multiplying two values, brnz refers to an operation implementing a conditional branch on non-zero:

...
z=add x y, i=dec i, pc=brnz i A;
A:u=mul d e, i=dec i, pc=brnz i A;
...

In the above example, the loop is preceded by a preamble in which in parallel to some other operations the loop counter i is decremented, and a conditional branch on non-zero, i.e. the loop counter i is not equal to zero, is taken to loop start address A. The next instruction at address A is the beginning of the loop body, in which loop counter i is further decremented, and is checked against zero to steer a conditional branch to address A. As a result of this construct, in every cycle starting from the preamble the value of the program counter pc written to register file RF3 will be equal to address A, effectively keeping the program counter pc fixed at this address until loop counter i reaches zero. As a result, a single instruction loop is created, although the branch latency in this example is larger than one. Constructs resembling the above will work for branch latencies equal to or larger than two, and any loop body containing a number of instructions smaller than that branch latency.

In another embodiment the communication network CN may be a partially connected communication network, i.e. not every execution unit EX1 and EX2 is coupled to all register files RF1 and RF2. In case of a large number of execution units, the overhead of a fully connected communication network will be considerable in terms of silicon area, delay and power consumption. During design of the VLIW processor it is decided to which degree the execution units are coupled to the register files, depending on the range of applications that has to be executed.

In a different embodiment more execution units are able to write new values of the program counter into the register file RF3. By allowing more execution units to perform the conditional execution of operations for writing values of the program counter in register file RF3, the scheduling of those operations will potentially result in more efficient programs since multiple guarded or conditional operations can be executed in parallel.

In another embodiment the distributed register file, comprising register files RF1 and RF2, is a single register file. In case the number of execution units of a VLIW processor is relatively small, the overhead of a single register file is relatively small as well.

In another embodiment, the VLIW processor may have a different number of execution units. The number of execution units depends on the type of applications that the VLIW processor has to execute, amongst others. The processor may also have more register files, connected to said execution units.

In another embodiment, the execution units EX1 and EX2 may have multiple inputs and/or multiple outputs, depending on the type of operations that the execution units have to perform, i.e. operations that require more than two operands and/or produce more than one result. The distributed register file may also have multiple read and/or write ports per register file.

A superscalar processor also comprises multiple issue slots that can perform multiple operations in parallel, as in case of a VLIW processor. However, the processor hardware itself determines at runtime which operation dependencies exist and decides which operations to execute in parallel based on these dependencies, while ensuring that no resource conflicts will occur. The principles of the embodiments for a VLIW processor, described in this section, also apply for a superscalar processor. In general, a VLIW processor may have more issue slots in comparison to a superscalar processor. The hardware of a VLIW processor is less complicated in comparison to a superscalar processor, which results in a better scalable architecture. The number of issue slots and the complexity of each issue slot, among other things, will determine the amount of benefit that can be reached using the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A processing system arranged for execution of a set of instructions under control of a program counter, the processing system comprising:
    an execution unit;
    a first register file arranged to store data, the first register file being accessible by the execution unit;
    a program memory arranged to store the set of instructions;
    a second register file arranged to store a value of the program counter, the second register file being accessible by the execution unit,
    and wherein the execution unit is arranged to conditionally execute a dedicated instruction for writing a value of the program counter into the second register file to initiate a delayed branching operation in which non-branch operations are executed prior to a branching operation.

2. A processing system according to claim 1, wherein the processing system further comprises a controller;
    wherein the second register file is accessible by the controller; and
    wherein the controller is arranged to use the value of the program counter stored in the second register file, to fetch an instruction from the program memory.

3. A processing system according to claim 2, wherein the controller is further arranged to increment the value of the program counter and to write the incremented value of the program counter into the second register file.

4. A processing system according to claim 3, wherein the processing system is further arranged to write either the value of the program counter incremented by the controller into the second register file, or to write the value of the program counter produced by the execution unit into the second register file, depending on the evaluation of a branch condition.

5. A processing system according to claim 1, wherein the execution unit is further arranged to evaluate a branch condition and subsequently use the result of the evaluation as a guard to conditionally execute a first dedicated instruction for writing a value of the program counter into the second register file.

6. A processing system according to claim 1, wherein the execution unit is further arranged to execute a second dedicated instruction;
    the second dedicated instruction having at least a first argument and a second argument, the second argument being a value of the program counter;
    wherein the second dedicated instruction is arranged to write the value of the program counter into the second register file, depending on the value of the first argument.

7. A processing system according to claim 1, wherein the processing system is a time-stationary Very Large Instruction Word (VLIW) processor, wherein the execution unit is a plurality of execution units and wherein the VLIW processor further comprises:
    a communication device arranged to couple the execution units and the first register file;
    and wherein the VLIW processor is further arranged to dynamically control the transfer of result data from an execution unit of the plurality of execution units to the first register file and the second register file, based on control information derived from the set of instructions.

8. A processing system according to claim 1, wherein the processing system is a data-stationary Very Large Instruction Word (VLIW) processor, wherein the execution unit is a plurality of execution units and wherein the VLIW processor further comprises:

a communication device arranged to couple the execution units and the first register file.

9. A VLIW processor according to claim 8, wherein the register file is a distributed register file.

10. A VLIW processor according to claim 8, wherein the communication device is a partially connected communication network.

11. A processing system arranged for execution of a set of instructions under control of a program counter, the processing system comprising:

an execution unit;

a first register file arranged to store data, the first register file being accessible by the execution unit;

a program memory arranged to store the set of instructions;

a second register file arranged to store a value of the program counter, the second register file being accessible by the execution unit, wherein the execution unit is arranged to conditionally execute a dedicated instruction for writing a value of the program counter into the second register file, and wherein the processing system is further arranged to execute a plurality of said dedicated instructions in parallel, and wherein during the compilation step it is guaranteed that only one instruction of the plurality of dedicated instructions is conditionally executed.

12. A method for executing a set of instructions by a processing system, wherein the processing system comprises:

an execution unit;

a first register file for storing data, wherein the first register file is accessible by the execution unit;

a program memory for storing the set of instructions;

a second register file for storing the program counter, wherein the second register file is accessible by the execution unit, and wherein the method comprises the following steps:

executing a dedicated instruction for writing a value of the program counter into the second register file;

using the value of the program counter for fetching an instruction from the program memory;

executing said instruction; and initiating a delayed branching operation in which non-branch operations are executed prior to executing the dedicated instruction.

13. A compiler program product stored on a computer readable medium being arranged for implementing all steps of the method for programming a processing system according to claim 12, when said compiler program product is executable on a computer system.

* * * * *